R. Egan,
Leather Burnisher,
No. 51,439. Patented Dec. 12, 1865.
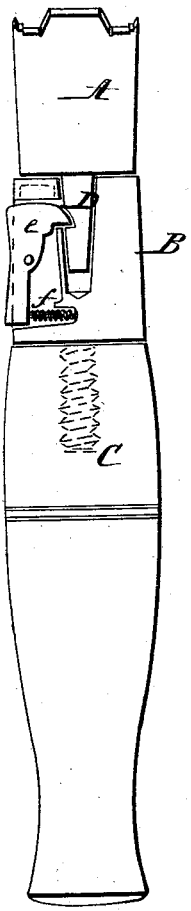
Witnesses:
C. L. Topliff
Thos Fusch
Inventor:
Richard Egan
per Munn & Co.
Atty.

UNITED STATES PATENT OFFICE.

RICHARD EGAN, OF BROOKLYN, NEW YORK.

IMPROVEMENT IN SHOE-MAKERS' BURNISHERS.

Specification forming part of Letters Patent No. 51,439, dated December 12, 1865.

*To all whom it may concern:*

Be it known that I, RICHARD EGAN, of Brooklyn, in the county of Kings and State of New York, have invented a new and useful Improvement in Shoe-Makers' Burnishing-Tools; and I do hereby declare that the following is a full, clear, and exact description thereof, which will enable others skilled in the art to make and use the same, reference being had to the accompanying drawing, forming part of this specification.

The drawing, consisting of only one figure, represents a burnisher made according to my invention.

This invention consists in making a burnishing-tool for polishing the edges of soles and heels of boots and shoes so that it is removable from its handle, and in so constructing the handle that it will not be easily injured when the burnisher is heated for use.

Burnishers for shoe-makers' use have been heretofore made by fitting each separate burnisher with its appropriate handle, to which it is firmly keyed. The handles are of wood, ferruled, so that they will not be readily split when the shank of the burnisher is driven or fitted in or when the tool is being used by the workman.

Burnishing-tools are heated preparatory to their use, and as a portion of the heat applied to the face of the tool will be conducted to its shank, which then expands, it follows that such expansion will enlarge the socket in which the shank is held, and afterward, when the shank cools, it contracts, and the tool is thenceforth loose in its handle. Moreover, a full kit or set of burnishing-tools for shoe-makers' use comprises from twenty-five to thirty burnishers, and since, by the present mode of preparing them, each has its handle, it follows that a great deal of space is required for them on the bench, and the expense of handles is multiplied by the number of tools used.

My invention has for its object to obviate and remove some of these objections and inconveniences and give increased facility in the use of these tools and diminish the expense of making them.

I make the burnisher itself with a notched shank, as is common in carpenters' bits and augers. The burnisher here shown is one of those used in the trade of shoe-making, and will serve as an illustration for the whole set.

The workman, in using these tools, seizes the handle with the whole hand, so as to use his utmost force upon the edges of the sole and heel to be polished. The handles are therefore made of the shape here shown, so that they readily adapt themselves to the hand. It is clear, from this manner of using the tools, that they should be firmly attached to their handles, and that the handles should be strong. I therefore make the upper part of the handles of wood and the lower part of metal, a socket being made in the metal part of the size and shape of the shank which is to fit therein.

The metallic part B of the handle should be of iron or other suitable material. I fit a latch, $e$, in one side of the metallic part of the handle, which latch takes into a notch cut on one side of the shank, being pushed therein by a spring, $f$, as seen in the drawing. I do not claim this method of seizing the shank of tools, and the latch and spring may be made and operated in other suitable ways, to suit the convenience or judgment of the maker.

The wooden part of the handle C may be attached to the metallic part B by means of a screw-shank projecting from the latter and taking into a tapped hole made to receive it in the base of the wooden part C. By this construction I prevent the wooden part of the handle from being injured by reason of the heat imparted to the burnisher.

When it is desired to change the tool, its shank is released from the latch $e$, and another tool of different size can be inserted.

My invention enables a workman to save the expense of many of the handles of the set of burnishing-tools, since he need provide only one handle for the whole set of burnishers. The shanks of the whole set, whatever the size or shape of the faces of the tools, are made of such a size and shape as to fit the socket in the metallic part B of the handle.

I claim and desire to secure by Letters Patent—

As a new article of manufacture, the shoemakers' burnisher consisting of a movable head, A, metallic socket B, and handle C, all substantially as herein described.

R. EGAN.

Witnesses:
   M. M. LIVINGSTON,
   C. L. TOPLIFF.